United States Patent [19]

Shajenko

[11] 4,115,753
[45] Sep. 19, 1978

[54] FIBER OPTIC ACOUSTIC ARRAY
[75] Inventor: Peter Shajenko, Storrs, Conn.
[73] Assignee: The United States of America as represented by the Secretary of the Navy, Washington, D.C.
[21] Appl. No.: 816,561
[22] Filed: Jul. 18, 1977
[51] Int. Cl.² .......................... G01S 3/80; H04R 23/00
[52] U.S. Cl. ........................................ 340/6 R; 340/9
[58] Field of Search ............ 350/9 G, 9 WG, 161 W, 350/6 R, 5 H, 13 R, 14

[56] References Cited

U.S. PATENT DOCUMENTS

| | | | |
|---|---|---|---|
| 3,611,277 | 10/1971 | Yoder | 340/14 |
| 3,903,496 | 9/1975 | Stimler | 340/2 |
| 3,920,982 | 11/1975 | Harris | 350/161 W |
| 4,002,896 | 1/1977 | Davies et al. | 350/96 WG |

OTHER PUBLICATIONS

Massey, "An Optical Heterodyne Ultrasonic Image Converter" Proc. IEEE, vol. 56, No. 12, Dec. 1968, pp. 2157-2161.

Primary Examiner—Richard A. Farley
Attorney, Agent, or Firm—Richard S. Sciascia; Arthur A. McGill; Prithvi C. Lall

[57] ABSTRACT

A fiber-optic acoustic array using optic hydrophones wherein sound waves are sensed and displayed as modulated light signals. The light signals so generated are transmitted along the fiber-optic bundles. Many such hydrophones are arranged to form acoustic arrays of increased sensitivity and directionality.

11 Claims, 4 Drawing Figures

FIBER OPTIC ACOUSTIC ARRAY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to acoustic line arrays and more particularly to an acoustic array which uses a plurality optic hydrophones and fiber-optic bundles.

Conventional sound sensing devices using piezoelectric transducers have been used in the past. These devices include piezoelectric materials which, when subjected to variations in pressure resulting from an impinging acoustic pressure wave, generate electrical signals which can be processed using electronic devices. However, the use of such transducers in acoustic arrays imposes many problems such as the use of electronic circuitry associated with them. The electronic circuitry used for each of the transducers forming a line array are distributed along the line and require power for their operation. Furthermore, there is a limit in the reduction of size and weight of acoustic arrays using piezoelectric transducers. In addition, the operational reliability of the acoustic arrays depends upon the electronic devices used. It is thus desirable to use optic hydrophones which do not require an associated electronics and thus eliminate electric power needed to drive such electronic devices, and thus improve the operation of the acoustic arrays. Furthermore, it is desirable to have acoustic arrays which are possible to be fabricated as integral units and which have improved self-noise performance and are less expensive.

SUMMARY OF THE INVENTION

The acoustic array system of subject invention includes a plurality of optic hydrophones arranged in a line and fiber-optic bundles for transmitting a reference laser beam and a laser signal beam. A signal laser beam affected by the acoustic pressure wave falling on a particular hydrophone of the acoustic array system is mixed with the properly delayed corresponding reference laser beam and the mixture is used to energize a corresponding photodetector providing an electrical signal as an output thereof. The output from each corresponding photodetector or the plurality of photodetectors associated with the plurality of optic hydrophones, is processed in a beam forming unit and is displayed to extract information about the acoustic pressure wave impinging upon the acoustic array.

An object of subject invention is to have an acoustic array which includes a plurality of optic hydrophones.

Another object of subject invention is to have an acoustic array which uses a laser beam for generating reference and signal beams.

Still another object of subject invention is to have an acoustic array which uses fiber-optic bundles for transmitting reference and signal beams.

Still another object of subject invention is to have an acoustic array which eliminates the use of piezoelectric transducers.

Another object of subject invention is to have an acoustic array which is an integral unit.

Still another object of subject invention is to have a passive acoustic array.

Other objects, advantages and novel features of this invention will become apparent from the following detailed description of the invention when considered in conjunction with the accompanying drawings wherein:

DESCRIPTION OF PREFERRED EMBODIMENTS

Figure 1:
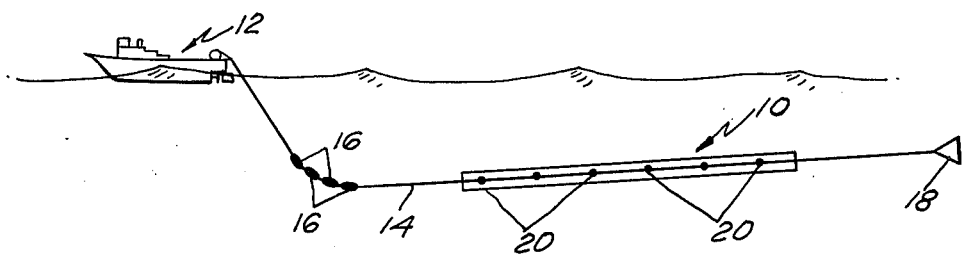
FIG. 1 is a schematic representation of a surface ship towing an acoustic array.
Figure 2:
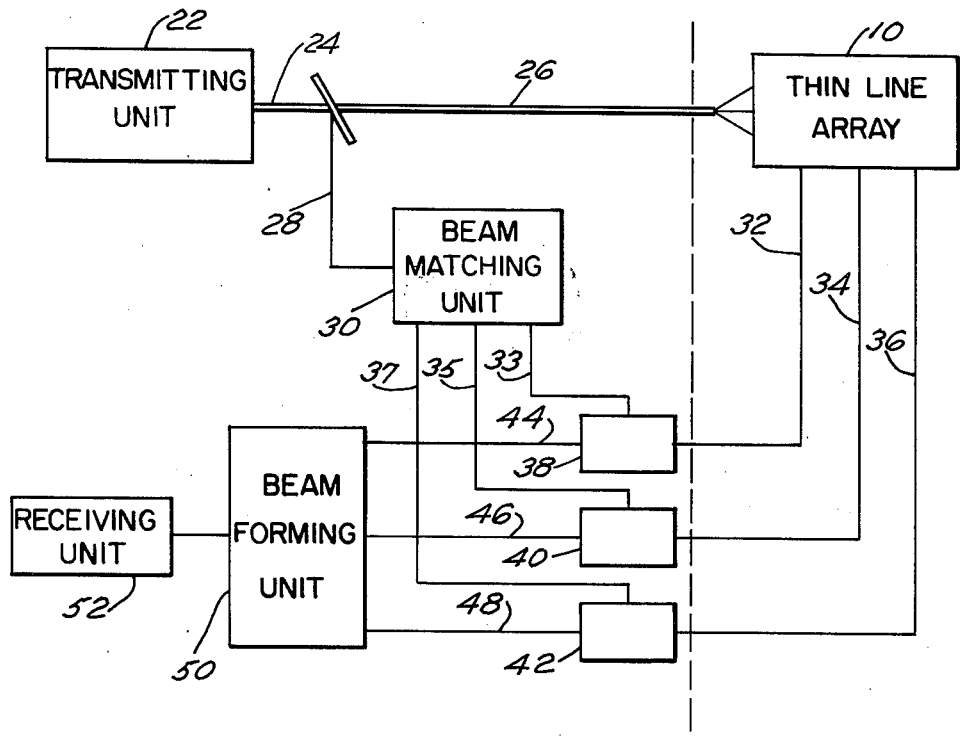
FIG. 2 is a block diagram representing the acoustic array system according to the teachings of subject invention.

Referring to the drawings wherein like reference characters designate like parts throughout the several views, and more particularly to FIG. 1 thereof, a schematic representation of an acoustic array 10 being towed by a surface ship 12 is shown. Acoustic array 10 is attached to surface ship 12 for towing purposes by means of tow cable 14. Weights 16 are used with the towing cable 14 to keep the acoustic array 10 at a desired position during its towing in water. The motion of acoustic array 10 is stabilized by drogue 18 which is attached to the tail end of the array. Acoustic array 10 includes a plurality of optic hydrophones designated by numeral 20. A detailed description of optic hydrophones 20 is given in my co-pending patent application; Ser. No. 673,180; filed Apr. 2, 1976. FIG. 2 shows a block diagram of an acoustic array system wherein the equipment in region 21 is aboard the ship while the equipment on the opposite side of region 21 is in a body of water. As shown in FIG. 2, transmitting unit 22, which includes a laser, a light beam divider, a Bragg cell and focusing means, sends out a laser beam via path 24 and is sub-divided into a signal beam traveling via path 26 and a reference beam traveling via path 28. The signal beam energizes each one of the plurality of the optic hydrophones 20 and travels via separate path such as paths 32, 34, and 36. Reference beam traveling via path 28 is optically delayed by means of a beam matching unit 30 which includes a plurality of adjustable optical delays so as to match each of the reference beams to the corresponding signal beam. For example, reference beam traveling via path 33 is optically delayed so as to match the signal beam traveling via path 32 and they are both mixed and made to energize photodetector 38. The output of photodetector 38 traveling via path 44 is an electrical signal which is sent to a beam forming unit 50. Likewise, the reference beam optically delayed and traveling via path 35 is matched with the signal beam from a corresponding member of transducers 20 and traveling via path 34 and is used to energize photodetector 40. Furthermore, reference beam traveling via path 37 is matched and mixed with the signal beam traveling via path 36 and they energize photodetector 42. Outputs 44, 46, and 48 of photodetectors 38, 40, and 42 respectively are sent to a beam forming unit 50 for forming the beam pattern which is sent to a receiving unit 52 for the purposes of data processing and displaying etc.

Figure 3:
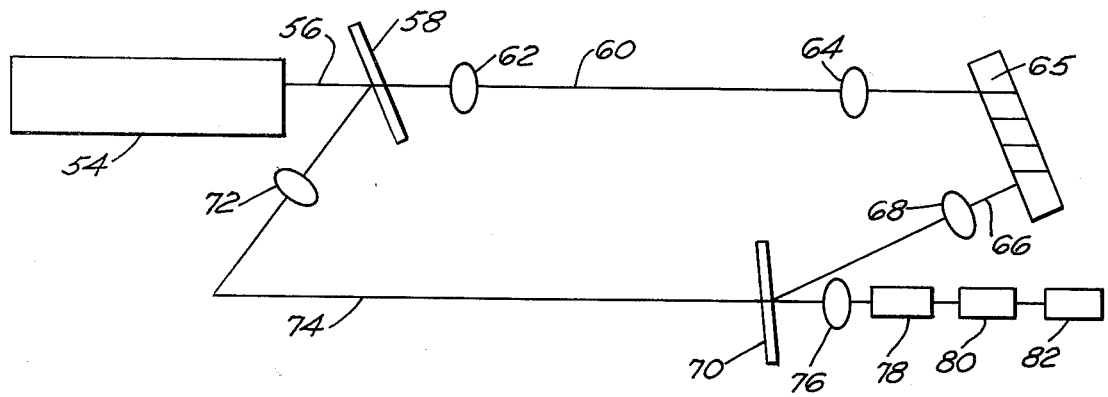
FIG. 3 is a block diagram of one of the hydrophones together with the optical equipment used in the fabrication of an acoustic array system.

FIG. 3 shows a detailed arrangement for one of the optic hydrophones 20 of the acoustic array 10 wherein laser 54, preferably a Helium-Neon laser, sends out an optical beam traversing fiber-optic bundle 56 and is divided at the beam splitter 58 into a signal beam traveling through fiber-optic bundle 60 having condensing lenses 62 and 64 thereof before it falls on the hydrophone such as hydrophone 65 where it experiences multiple reflections which modulate the signal beam due to the change in the distance between the two parallel mirrors of transducer 65 due to incoming acoustic pressure wave. The output of the hydrophone 65 traveling fiber-optic bundle 66 is focused by lens 68 and is allowed to fall on beam splitter 70. The reference beam is made to traverse through a condensing lens 72 in path 74 and is allowed to fall on beam splitter 70. The paths traversed by the signal beam and the reference beam have more or less identical ambient conditions. The reference beam and the signal beam are combined at the beam splitter 70 and is condensed by condensing lens 76 and is allowed to fall on photodetector 78. Resulted information is received with receiver 80 and displayed on displaying device 82.

Figure 4:
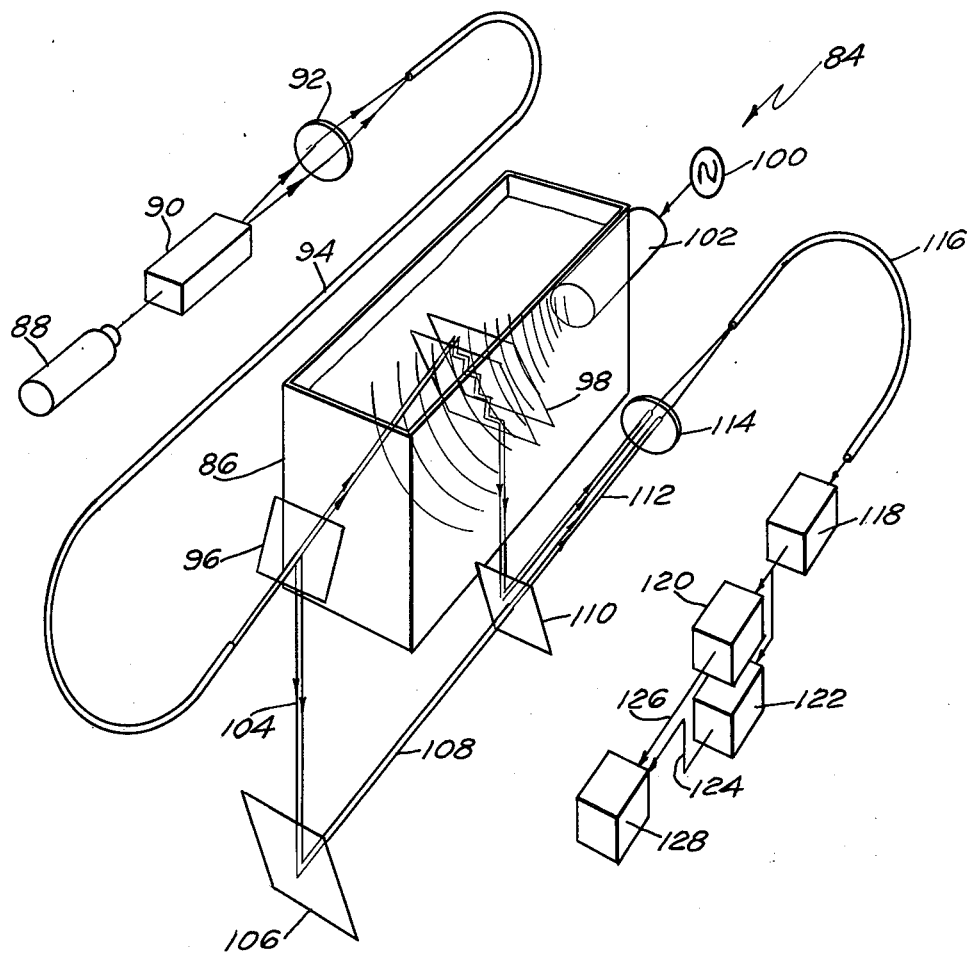
FIG. 4 is a schematic representation of an acoustic array system which uses a single fiber optic bundle.

FIG. 4 is a block diagram of another embodiment of an acoustic array system 84 which uses a single fiber-optic bundle which allows both homodyne and heterodyne detection using a water tank 86. A laser beam from laser 88 preferably a He-Ne laser, is passed through Bragg cell 90 and condensed by lens 92. Bragg cell 90 acts like a diffraction grating to the incident laser beam and its output includes the incident laser beam and various orders of diffraction. However, preferably the first order diffraction in the Bragg cell output is used. The condensed laser beam travels through fiber-optic bundle 94 and falls on beam splitter 96 which generates a signal beam falling on the two parallel mirror arrangement 98 of an optic hydrophone housed in water tank 86. An acoustic signal generator 100 transmits an acoustic pressure wave through path 102 onto mirror arrangement 98 as shown in FIG. 4. A reference beam traveling path 104 is made to fall on mirror 106 and travels path 108 so as to be combined, at beam splitter 110, with a signal beam reflected out of mirror arrangement 98 in water tank 86. The output of beam splitter 110 traveling path 112 is collimated by lens 114 and is made to travel through optic fiber 116 and to energize photodetector 118. The electrical signals generated by photodetector 118 are either detected using heterodyne detection 120 or detected using homodyne detection 122. The outputs 124 and 126 are displayed on displaying unit 128 such as a dual beam oscilloscope. The essential element of the acoustic array system is the plurality of optic hydrophones 20, which provide frequency modulation of a laser beam by an acoustical pressure wave via doppler shift effect due to the relative motion of the two parallel mirror arrangement of the optic hydrophones. Each of these hydrophones has two facing, multi-reflecting surfaces between which a laser beam is propagated. As a result of the shift in frequency of the laser beam at each reflection in proportion to the instantaneous velocity of the reflecting surface, high multiplication of the frequency shift is attainable. The signal is detected by mixing the Doppler-shifted beam on the surface of a photodetector. The mutual coherence of the Dopper-shifted laser beam and that of the reference beam is maintained by exposing both beams to the same propagation condition; i.e., by using the same optical fiber for both beams which allows simultaneous detection of homodyne (the signal and reference beams having same frequency) and heterodyne (the signal and reference beams having different frequencies) interference modes carrying an imposed acoustical signal. Two separate fiber-optic bundles can be used as shown in FIG. 2 if the ambient conditions permit.

It should be noted that the components of an acoustic array system of subject invention are conventional units which can be substituted by similar components. However, the laser used was He-Ne laser, Model Type 125 made by Spectra Physics Corp. The focusing or condensing lenses used were Baush and Lomb Lens, Type 21X. Beam splitters used were 50–50% beam splitter made by Valteic Corp. Photodetectors used were RCA 7336. Fiber-optic bundles used were Galite 3000 by Galel Co. F.M. receiver used for heterodyne detection was Heterodyne Voltmeter Type 2007 by Bruel and Kjaer Co. The oscilloscope used was Tektronix Model 454.

Briefly stated, an acoustic array according to the teachings of subject invention includes a plurality of optic hydrophones, each one of them having more than one multi-reflecting surface. A laser beam impinging the reflecting surfaces arrangement produces a Doppler shift in the frequency thereof. The detection of the acoustical pressure is accomplished by mixing the Doppler shifted laser beam from the hydrophone with the reference beam on the surface of a photodetector.

Obviously, many modifications and variations of the present invention are possible in the light of the above teachings. As an example, the components such as laser, fiber-optic bundles, focusing lenses, etc. can be substituted by similar units. Furthermore, the detection techniques may vary without deviating from the basic principle. It is therefore understood that within the scope of the appended claims the invention may be practiced otherwise than specifically described. I claim:

1. A fiber-optic acoustic array for detecting acoustic signals in a body of water which comprises:
    a transmitting unit for generating and sending a laser beam as an output thereof;
    a line array including a plurality of optic hydrophones positioned in series in a line, said line array being coupled to said transmitting unit for receiving the output thereof as an input for each of said plurality of hydrophones from said transmitting unit;
    a beam matching unit including a plurality of optical delay lines, said beam matching unit being coupled to said transmitting unit for receiving as an input for each of said plurality of optical delay lines from said transmitting unit;
    a plurality of photodetectors, each photodetector being coupled to a corresponding hydrophone of said plurality of optic hydrophones of said line array and to a corresponding optical delay line of said plurality of optical delay lines;
    a beam forming unit coupled to said plurality of photodetectors, receiving its input therefrom; and
    a receiving unit coupled to said beam forming unit, said receiving unit getting an input thereof from said beam forming unit.

2. The fiber-optic acoustic array of claim 1 wherein said transmitting unit includes a laser for generating said laser beam, a beam splitter for splitting said laser beam into a reference beam and a signal beam, and a plurality of optical condensers in the paths of said signal and reference beams.

3. The fiber-optic acoustic array of claim 2 wherein each of said plurality of hydrophones includes at least a pair of generally parallel mirrors for amplifying the doppler shift of said signal beam caused by acoustic signals from an acoustic source.

4. The fiber-optic acoustic array of claim 3 wherein said transmitting unit and said line array are coupled by means of a first fiber-optic bundle.

5. The fiber-optic acoustic array of claim 4 wherein said transmitting unit and said matching unit are coupled by means of a second fiber-optic bundle.

6. The fiber-optic acoustic array of claim 5 wherein said plurality of photodetectors are coupled to said beam matching unit and the plurality of hydrophones of said line array by means of a third fiber-optic bundle and a fourth fiber-optic bundle respectively.

7. The fiber-optic acoustic array of claim 3 wherein said receiving unit includes a signal receiver and a displaying means.

8. A fiber-optic acoustic array for heterodyne and homodyne detection of acoustic signals in a body of water comprising:
   a laser for generating a beam of first frequency;
   a Bragg cell being coupled to said laser for input thereof;
   a fiber-optic bundle for transmitting the output of said Bragg cell;
   a beam splitting means for splitting the output of said Bragg cell into a reference beam and a signal beam
   modulating means for modulating the signal beam using a plurality of transducers, each of said plurality of transducers including a pair of generally parallel mirrors;
   means for combining the reference beam and the modulated signal beam to obtain a resultant beam
   means for converting the combined resultant beam into electrical signals;
   receiving means for receiving said electrical signals and
   means for displaying the output of said receiving means.

9. The fiber-optic acoustic array of claim 8 wherein said modulating means includes a source of acoustic signals being placed in the path of the signal beam in the body of water.

10. The fiber-optic acoustic array of claim 9 wherein said means for converting the combined resultant beam into electrical signals is a photodetector.

11. The fiber optic acoustic array of claim 9 wherein said receiving means includes a homodyne detector and a heterodyne detector.

* * * * *